(12) United States Patent
Anderson

(10) Patent No.: US 9,377,628 B2
(45) Date of Patent: Jun. 28, 2016

(54) LASER GAME MARKER

(71) Applicant: Ken Anderson, Evans, GA (US)

(72) Inventor: Ken Anderson, Evans, GA (US)

( * ) Notice: Subject to any disclaimer, the term of this patent is extended or adjusted under 35 U.S.C. 154(b) by 0 days.

(21) Appl. No.: 13/847,976

(22) Filed: Mar. 20, 2013

(65) Prior Publication Data

US 2014/0286003 A1    Sep. 25, 2014

(51) Int. Cl.
*G02B 27/20* (2006.01)
*A01K 75/02* (2006.01)
*A63B 57/00* (2015.01)
*A01M 31/00* (2006.01)

(52) U.S. Cl.
CPC ............... *G02B 27/20* (2013.01); *A01M 31/00* (2013.01)

(58) Field of Classification Search
CPC ..... Y10S 33/21; Y10S 148/097; G02B 27/09; G02B 27/0916; G02B 27/20; F21V 21/29; F21S 8/033
USPC ................... 362/259, 145, 147, 275, 287, 43; 473/407
See application file for complete search history.

(56) References Cited

U.S. PATENT DOCUMENTS

| | | | |
|---|---|---|---|
| 3,033,919 A * | 5/1962 | Aschinger | 174/151 |
| 3,380,697 A * | 4/1968 | Melcher | 248/217.4 |
| 4,160,285 A * | 7/1979 | Shibla | 362/145 |
| 4,926,438 A | 5/1990 | Maes | |
| 5,791,766 A | 8/1998 | Lee | |
| 6,238,298 B1 * | 5/2001 | Chen | 473/220 |
| 6,874,908 B2 | 4/2005 | Sharrah et al. | |
| 7,153,216 B1 * | 12/2006 | Pressley | 473/220 |
| 7,290,898 B2 * | 11/2007 | Martin et al. | 362/191 |
| 7,762,684 B2 | 7/2010 | Wilson et al. | |
| 7,803,059 B2 * | 9/2010 | Zhang | 473/220 |
| D699,875 S * | 2/2014 | Christianson et al. | D26/39 |
| 2003/0034649 A1 * | 2/2003 | Gault et al. | 285/125.1 |
| 2010/0321939 A1 * | 12/2010 | Patel | 362/253 |

OTHER PUBLICATIONS

Jerry Allen "After the shoot: Blood tracking whitetails" Nov. 22, 2010 <http://www.northamericanwhitetail.com/tactics/hunting-strategies/huntingtactics_naw_blood_121008/>.*
Jerry Allen, North American Whitetail, After the Shot: Blood Tracking Whitetails, http://www.northamericanwhitetail.com/tactics/hunting-strategies/huntingtactics_naw_blood_121008/.
Dan Stefanich, Chicago Tribune, Recover More Deer With Great Blood Trailing and Tracking Tips, Dec. 7, 2015, http://www.chicagonow.com/dan-stef-outdoors/2015/12/recover-more-deer-with-great-blood-trailing-and-tracking-tips/.
Ditchkoff et. al., Wounding Rates of White-tailed Deer With Traditional Archery Equipment, 1998, http://www.animalalliance.ca/wp-content/uploads/2011/07/deer-wounding-rates-deer-and-bow-hunting1998.pdf.

* cited by examiner

*Primary Examiner* — Jason Moon Han
*Assistant Examiner* — Omar Rojas Cadima
(74) *Attorney, Agent, or Firm* — Kenneth Buffington

(57) ABSTRACT

The laser game marker comprises a battery compartment, flexible tube, and laser compartment. A reversible spike in the battery compartment allows the device to securely attach to a tree, wood, or other porous surface. The flexible tube allows the laser to point or mark the freshly killed game while hunting. The laser game marker is a device for marking the exact position of the first shot or freshly killed game.

15 Claims, 4 Drawing Sheets

LASER GAME MARKER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to a laser, and in particular to a laser having a flexible and/or bendable lighted end used for marking game while hunting.

2. Background of the Invention

There are many patents related to laser pointers indicating the wide scope of such inventions. Numerous laser pointers have been provided in the prior art. For example, U.S. Pat. No. 7,762,684 to Wilson; U.S. Pat. No. 5,791,766 to Lee; U.S. Pat. No. 5,697,700 to Huang; and U.S. Pat. No. 4,926,438 to Maes all are illustrative of such prior art. While these units are designed as laser pointers they are not flexible or bendable. As such, they would not be suitable for the purpose of marking and tracking freshly killed game while hunting.

The problem is that an animal is often not instantly killed by the hunter. Most animals can travel very fast when wounded and can travel a long distance. Blood is the best evidence of how well an animal is hit, and often provides the most visible trail to recovering the animal. The hunter must track the wounded animal. Following the wounded animal's blood trail is an essential skill that must be developed to responsibly retrieve game. Many times the hunter can not find the beginning of the blood trail. Before leaving the stand the hunter must find a waypoint to know where the animal was standing when the shot was taken. The instant invention accurately pinpoints the location at which the animal is hit by the first shot so as to mark the beginning of the blood trail.

SUMMARY OF THE INVENTION

The present invention comprises a battery compartment, flexible tube, and laser compartment. A reversible spike in the battery compartment allows the device to securely attach to a tree, wood, or other porous surface. The flexible tube allows the laser to point or mark the freshly killed game or blood trail while hunting.

BRIEF DESCRIPTION OF THE DRAWINGS

Referring now to the drawings in which like reference numbers represent corresponding parts throughout.

DETAILED DESCRIPTION OF THE INVENTION

Figure 1:
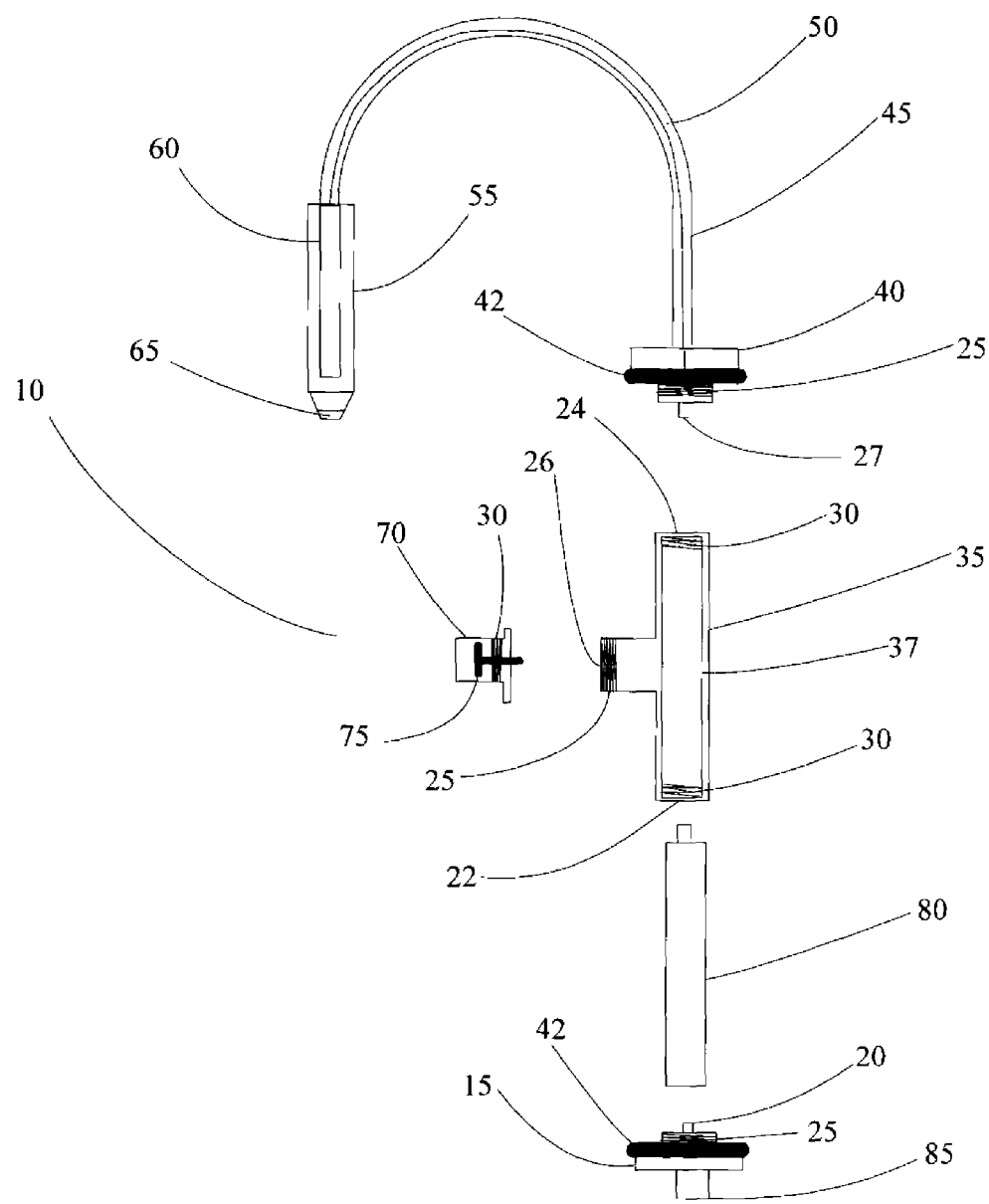
FIG. 1 is a side perspective view of the laser game marker with the spike in the inward position according to a preferred embodiment of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Referring now to the drawings, the laser game marker, designated broadly at 10, is illustrated in FIGS. 1-4. The laser game marker 10 primarily consists of three major components: battery compartment 35, laser compartment 55, and flexible tube 45.

Figure 2:
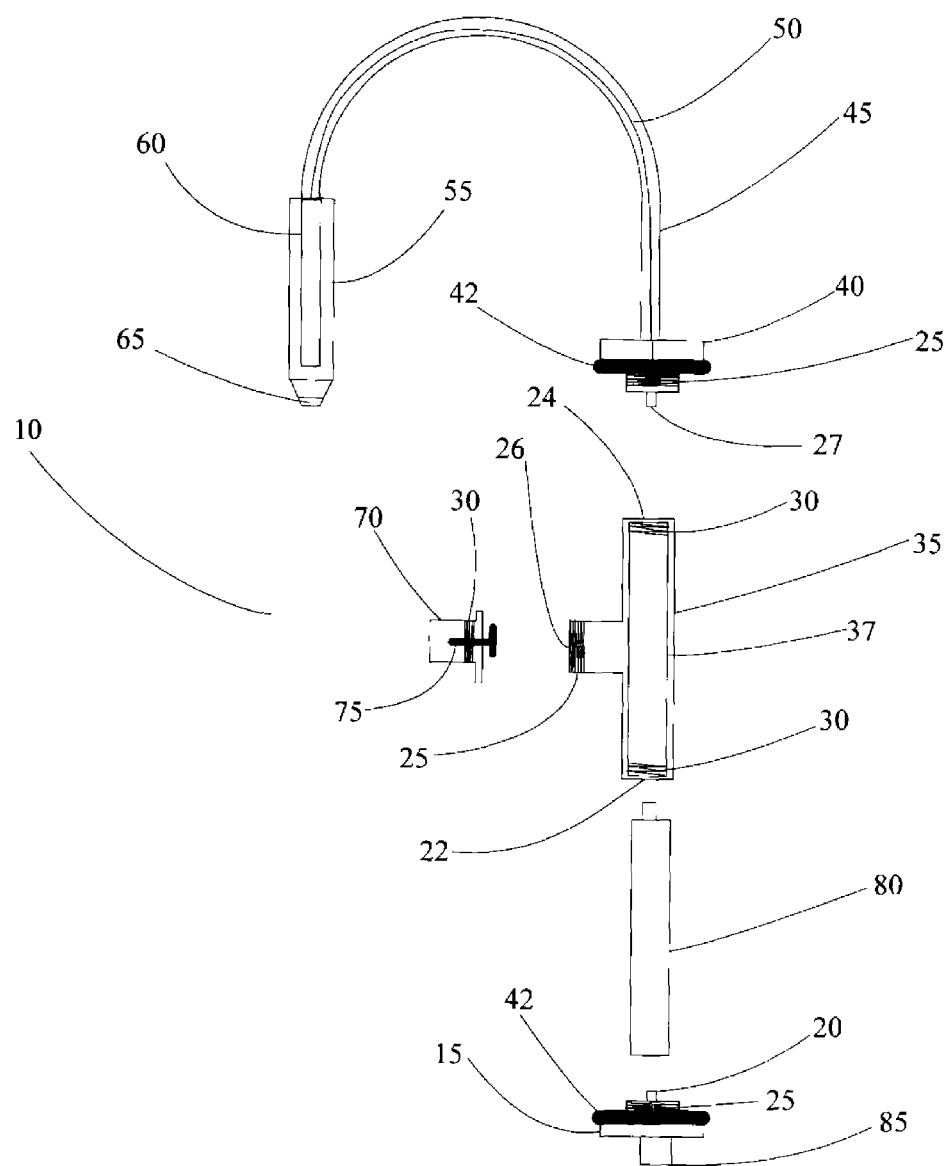
FIG. 2 is a side perspective view of the laser game marker with the spike in the outward position according to a preferred embodiment of the present invention.

As best shown in FIGS. 1-2, the battery compartment 35 is a T-shaped cylindrical structure which is internally lined on the surface with a metallic sleeve 37. The battery compartment 35 has three openings: bottom 22, top 24, and side 26.

The bottom opening 22 accommodates a battery 80. The bottom opening 22 is provided with female threads 30 to mate with the male threads 25 on the bottom plug 15. The bottom plug 15 includes a pushbutton switch 85, a washer 42, and a negative post 20 to contact the negative side of the battery 80 inside the battery compartment 35. The batteries may be AA, AAA, watch batteries, or any other type battery that will fit into the compartment 35. The pushbutton switch 85 may be a simple ON/OFF switch or it may include electronics to provide an intermittent flash.

The top opening 24 is provided with female threads 30 to mate with the male threads 25 on the top plug 40. The top plug 40 includes a positive post 27 to contact the positive side of the battery 80 on one end and a flexible tube 45 on the opposite end.

The side opening 26 is provided with male threads 25 to mate with the female threads 30 on the spike holder 70. The spike holder 70 includes a reversible spike 75 with a large head that is approximately the diameter of the spike holder 70. The spike 75 is used to attach the game pointer to a tree or other porous object. The spike 75 may be a simple nail or it may have threads to twist into the porous object. When the game pointer 10 is not in use, the reversible spike 75 points inward and is totally enclosed by the spike holder 70 as best shown in FIG. 1. When the game pointer 10 is in use, the reversible spike 75 is exposed and points outward as best shown in FIG. 2. The spike 75 is secured in an outward position by the large nail head sandwiched between the spike holder 70 and side opening 26. As an alternate method of attachment, the laser game marker 10 may include a clip for attachment to the tree stand.

The laser compartment 55 is firmly mounted on the extreme distal end of the flexible tube 45. The laser compartment 55 is typically metallic and bullet shaped. The laser diode module 60 is totally enclosed within the laser compartment 55. A lens 65 is provided on the end of the laser compartment 55 to collimate the laser light.

Figure 4:
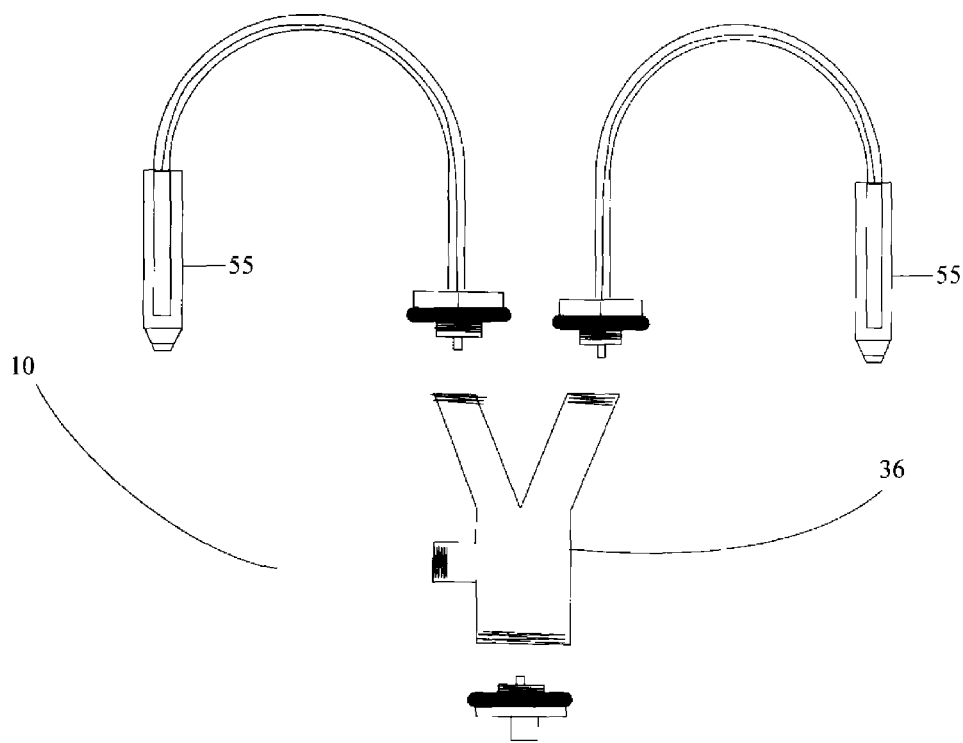
FIG. 4 is a side perspective view of the laser game marker with dual laser compartments according to a preferred embodiment of the present invention.

A flexible metallic tube 45 connects the laser compartment 55 on one end with the top plug 40 and washer 42 on the opposite end. The flexible metallic tube 45 and other components may be covered by heat shrink tubing, tape, or other material to provide water resistance to the laser game marker 10. A single conductor 50 runs from the positive post 27 on the top plug 40 through the flexible tube 45 to the laser compartment 55. Only a single conductor 50 is required since the metallic sleeve 37 inside the battery compartment 35, the metallic flexible tube 45, and metallic laser compartment 55 serve to complete the electrical circuit to the negative post 20 on the bottom plug 15. FIG. 4 shows an alternate design which provides a Y-shaped battery compartment 36 and dual laser compartments 55.

Figure 3:
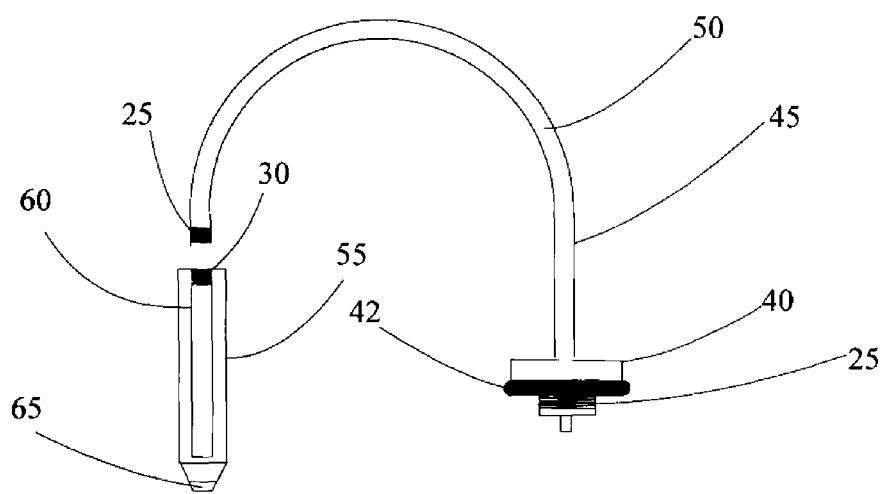
FIG. 3 is a side perspective view of the laser game marker's flexible tubing and removable laser compartment according to a preferred embodiment of the present invention.

As shown in FIG. 3, the laser compartment is readily replaceable to accommodate different color lasers. The distal end of the flexible tube 45 is provided with male threads 25 to mate with the female threads 30 inside the laser compartment 55. Laser diode modules 60 provide power typically less than or equal to 5 mW at wavelengths about 650 nm for a red laser light. Other laser diode modules 60 may provide blue or green laser light.

In low light operation, with the laser game marker 10 in the OFF position, the hunter unscrews the spike holder 70 to expose the reversible spike 75, and places the spike 75 in the outward position. The hunter uses the spike 75 to secure the laser game marker 10 to a tree trunk near the deer stand. After the hunter kills a deer or other game, the hunter turns the laser game marker 10 to the ON position and bends the flexible tube 45 so that the bright laser light is aimed directly at the spot where the game was standing upon firing the first shot. This allows the hunter to go directly to the spot to find the blood trail. The hunter can continue hunting while knowing that the precise location of the first hit is clearly identified for later harvest. The hunter recovers the animal and easily finds the tree stand by following the bright laser light.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. For example, the metallic sleeve inside the battery compartment could be eliminated if two conductors; instead of just one conductor, is run through the flexible tubing. Also, the laser compartment may be mounted such that they are activated and positioned via a remote control device. Accordingly, all such modifications are intended to be included within the scope of this invention as defined in the claims.

I claim:

1. A laser game marker comprising:
    a.) a battery compartment having two top openings, one bottom opening, and one side opening;
    b.) a top plug threaded into each said two top openings;
    c.) a bottom plug threaded into said bottom opening;
    d.) a spike holder threaded into said side opening;
    e.) an elongated flexible metallic tube having a first end thereof extending from each said top plug, and including at least one electrical conductor extending substantially a length thereof; and
    f.) a laser light source disposed at a second end of each said elongated flexible tube distal said top plug and connected to the at least one electrical conductor thereof; at least one battery in said battery compartment; and a switch mounted on said bottom plug for selectively connecting said laser light source and said at least one battery in circuit via the at least one conductor of each said elongated flexible tube for causing said laser light source to produce light.

2. The laser game marker as claimed in claim 1, wherein said spike holder is reversible in the inward or outward direction.

3. The laser game marker as claimed in claim 1, wherein said battery compartment is Y-shaped.

4. The laser game marker as claimed in claim 1, wherein said circuit connects to battery ground via metallic components.

5. The laser game marker as claimed in claim 1, wherein said laser light source further consists of a red, blue, or green laser diode module.

6. A method of tracking freshly shot game comprising the steps of:
    a.) securing a laser game marker to a fixed object in a stand;
    b.) shooting a game;
    c.) activating the laser game marker light;
    d.) bending a flexible tubing to point the laser game marker light at the point in which the game was first shot;
    e.) leaving the stand and moving towards the point of the first shot;
    f.) following a blood trail to retrieve the wounded game;
    g.) recovering the game; and
    h.) using the laser light to find the stand.

7. The method of tracking freshly shot game of claim 6, wherein said fixed object is a stand, tree, or other porous material.

8. The method of tracking freshly shot game of claim 6, wherein said activating the laser light is via pushbutton.

9. The method of tracking freshly shot game of claim 6, wherein said securing a laser game marker is via a reversible spike.

10. The method of tracking freshly shot game of claim 6, wherein said securing a laser game marker is via a clip.

11. A laser game marker comprising:
    a.) a battery compartment having a top opening, a bottom opening, and a side opening;
    b.) a top plug threaded into said top opening;
    c.) a bottom plug threaded into said bottom opening;
    d.) a spike holder threaded into said side opening;
    e.) a reversible spike in said spike holder;
    f.) a single continuous elongated flexible metallic tube that flexes a full 360° extending from said top plug, at least one electrical conductor extending substantially a length thereof; and
    g.) a laser light source disposed at a second end of said elongated flexible tube distal said top plug and connected to the at least one electrical conductor thereof;
    h.) at least one battery in said battery compartment; and
    i.) an ON/OFF switch for selectively connecting said laser light source and said at least one battery in circuit via the at least one conductor of said elongated flexible tube for causing said laser light source to produce light.

12. The laser game marker as claimed in claim 11, wherein said spike holder is reversible in the inward or outward direction.

13. The laser game marker as claimed in claim 11, wherein said battery compartment is T-shaped.

14. The laser game marker as claimed in claim 11, wherein said circuit connects to battery ground via metallic components.

15. The laser game marker as claimed in claim 11, wherein said laser light source further consists of a red, blue, or green laser diode module.

\* \* \* \* \*